United States Patent
Erdman (12) 
(10) Patent No.: US 11,488,211 B1
(45) Date of Patent: *Nov. 1, 2022

(54) VIRAL MARKETING OBJECT ORIENTED SYSTEM AND METHOD

(71) Applicant: PayAsOne Intellectual Property Utilization, LLC, Indianapolis, IN (US)

(72) Inventor: Kevin Richard Erdman, Indianapolis, IN (US)

(73) Assignee: PAYASONE, LLC, Salem, NH (US)

( * ) Notice: Subject to any disclaimer, the term of this patent is extended or adjusted under 35 U.S.C. 154(b) by 90 days.

This patent is subject to a terminal disclaimer.

(21) Appl. No.: 16/787,511

(22) Filed: Feb. 11, 2020

Related U.S. Application Data (63) Continuation of application No. 13/440,898, filed on Apr. 5, 2012, now Pat. No. 10,055,766, and a continuation of application No. 16/105,176, filed on Aug. 20, 2018, now Pat. No. 10,559,011, which is a continuation of application No. 13/440,898, filed on Apr. 5, 2012, now Pat. No. 10,055,766, which is a continuation of application No. 13/372,090, filed on Feb. 13, 2012, now abandoned.

(60) Provisional application No. 61/442,746, filed on Feb. 14, 2011.

(51) Int. Cl.
*G06F 16/00* (2019.01)
*G06Q 30/02* (2012.01)
*G06F 16/958* (2019.01)

(52) U.S. Cl.
CPC ....... *G06Q 30/0269* (2013.01); *G06F 16/958* (2019.01)

(58) Field of Classification Search
None
See application file for complete search history.

(56) References Cited

U.S. PATENT DOCUMENTS

| | | | |
|---|---|---|---|
| 6,157,926 A | 12/2000 | Appleman et al. | |
| 6,185,558 B1 | 2/2001 | Bowman et al. | |
| 6,665,659 B1 | 12/2003 | Logan | |
| 6,983,272 B2* | 1/2006 | Davis | G06Q 30/04 |
| | | | 707/748 |
| 7,739,408 B2 | 6/2010 | Fish et al. | |
| 7,747,612 B2 | 6/2010 | Thun et al. | |
| 7,831,596 B2 | 11/2010 | Rail et al. | |
| 7,836,050 B2 | 11/2010 | Jing et al. | |
| 8,250,054 B2 | 8/2012 | Bennett | |
| 8,332,512 B1* | 12/2012 | Wu | G06Q 50/01 |
| | | | 709/224 |
| 8,413,042 B2 | 4/2013 | Holt et al. | |
| 8,452,781 B2 | 5/2013 | Stefik et al. | |
| 8,595,297 B2 | 11/2013 | Marcucci et al. | |
| 2001/0047354 A1* | 11/2001 | Davis | G06Q 30/0633 |
| | | | 707/748 |
| 2002/0049752 A1 | 4/2002 | Bowman et al. | |
| 2003/0149937 A1* | 8/2003 | McElfresh | G06Q 30/0244 |
| | | | 715/210 |
| 2003/0195877 A1* | 10/2003 | Ford | G06F 16/951 |
| 2007/0005646 A1 | 1/2007 | Dumals et al. | |

(Continued)

*Primary Examiner* — Maikhanh Nguyen
(74) *Attorney, Agent, or Firm* — Kevin R. Erdman; Brannon Sowers & Cracraft PC (57) ABSTRACT

The present invention involves a web site advertising placement system and method which identifies web sites unaffiliated with the advertiser and related to a topic being advertised to provide advertising links that refer to unaffiliated web sites.

13 Claims, 3 Drawing Sheets

(56) References Cited

U.S. PATENT DOCUMENTS

| | | |
|---|---|---|
| 2008/0071929 A1 | 3/2008 | Motte et al. |
| 2009/0012969 A1 | 1/2009 | Rail et al. |
| 2009/0063630 A1 | 3/2009 | Obasanjo et al. |
| 2009/0094638 A1 | 4/2009 | Brier et al. |
| 2009/0216577 A1 | 8/2009 | Killebrew |
| 2009/0265737 A1* | 10/2009 | Issa .................... H04N 21/4788 725/38 |
| 2009/0287656 A1 | 11/2009 | Bennett |
| 2009/0287657 A1 | 11/2009 | Bennett |
| 2010/0058195 A1 | 3/2010 | Stefik et al. |
| 2010/0125540 A1 | 5/2010 | Stefik et al. |
| 2010/0179875 A1* | 7/2010 | Naito ................ G06Q 30/0256 705/14.54 |
| 2010/0191741 A1 | 7/2010 | Stefik et al. |
| 2010/0306249 A1* | 12/2010 | Hill ....................... G06Q 50/01 707/769 |
| 2011/0196863 A1 | 8/2011 | Marcucci et al. |
| 2012/0158637 A1 | 6/2012 | Kshetramade et al. |

\* cited by examiner

VIRAL MARKETING OBJECT ORIENTED SYSTEM AND METHOD

CROSS-REFERENCE TO RELATED APPLICATIONS

This is a continuation of U.S. application Ser. No. 16/105,176, filed Aug. 20, 2018, now U.S. Pat. No. 10,559,011; U.S. application Ser. No. 13/440,898, filed Apr. 5, 2012, now U.S. Pat. No. 10,055,766; which is a continuation of Ser. No. 13/372,090, filed Feb. 13, 2012, now abandoned; which claims priority to U.S. Provisional application Ser. No. 61/442,746, filed Feb. 14, 2011; the entire disclosure of each of which is incorporated by reference herein.

BACKGROUND OF THE INVENTION

Field of the Invention

The invention relates to search engine software. More specifically, the field of the invention is that of search engine software for serving advertising content to web sites.

Description of the Related Art

Site-targeted advertising is used by advertisers to display advertisements on internet web sites. Run by search engine companies, the site-targeting advertising allows advertisers to use keywords, domain names, topics, and demographic targeting preferences so that advertisements are dynamically placed on search results and web sites on relevant sites or with relevant users. U.S. Pat. Nos. 6,983,272; 7,577,665; 7,739,295; and 7,860,871; and United States Patent Publications Nos. 2009/0157523; 2010/0250370; and 2010/0306249; all disclose such site-targeted advertising systems, the disclosures of which are incorporated by reference herein.

Viral marketing and viral advertising refer to marketing techniques that use pre-existing social networks to produce increases in brand awareness or to achieve other marketing objectives (such as product sales) through self-replicating viral processes, analogous to the spread of virus or computer viruses. It can be word-of-mouth delivered or enhanced by the network effects of the Internet. Viral promotions may take the form of video clips, interactive Flash games, advergames, ebooks, brandable software, images, or even text messages.

The goal of marketers interested in creating successful viral marketing programs is often to identify individuals with high social networking attraction through their posts, biogs, or other user generated content and create viral messages that appeal to this segment of the population that place high credibility in the source of the social networking activities and thus have a high probability of accepting and identifying with the messages provided by those individuals.

The term "viral marketing" has also been used pejoratively to refer to stealth marketing campaigns-the unscrupulous use of astroturfing on-line combined with undermarket advertising in shopping centers to create the impression of spontaneous word of mouth enthusiasm.

SUMMARY OF THE INVENTION

The present invention is a network content placement system and method which identifies relevant social media content relating to a topic and delivers references to that content as part of the content placement.

In one embodiment of the system of the present invention, search engine web crawlers evaluate multiple web sites and provide content based indexes that may be used to identify and/or classify the content of a web site. While many web sites may be associated with particular products or positions, others may be independently developed and express a relatively neutral opinion that is more highly regarded by web searchers. The search engine obtains site information (such as metadata about the site, content of the site, cookies of the visitor the site, and/or search history of the visitor, etc.) and correlates that with the type of content related to a particular topic that is desired to be delivered to the viewer. In one embodiment, control panel software (the software indicating how an advertiser wants to place ads) is provided to advertisers to specify the parameters of the delivered content to certain viewer parameters. Once a correlation is specified, the advertiser's viral marketing strategy is used to select web links to place on the correlated viewer for her/his web site or web site visit. Like traditional site-targeted advertising, banner ads and the like may also be presented. However, the systems of embodiments of the present invention also provide web links to third party sites that meet certain criteria. Generally, such criteria involve positive content regarding the advertiser's object. For example, a product advertiser would want the visitor to see references, e.g. links or frames, to favorable third party product reviews. In addition, the product advertiser generally desires references to third party information that supports features or attractions of the product. Similarly, services and/or positions may be advocated with such placement of relevant third party links to support the quality or need for the service, or aspects of the arguments in favor of a particular position on a social, political, and/or personal issue.

In addition to correlating desired content on the basis of favorability or unfavorability to a desired type of content, in one embodiment the search engine also evaluates web sites in regard to its connection to third parties. For example, metadata about a web site indicating common ownership with a product or cause is indicative of potential bias, and the search results may then be presented on a multi-factor scale, namely both the correlation with desired message content and a rating of the independence of the content. Thus references may be further segregated in search results by independence rating, where an advertiser or promoter may discard non-independent content or alternatively display the reference to the viewer along with an explanation of the potential bias or disclaimer of the referenced web site.

The web crawler operates in a conventional way to catalog the myriad of web sites available over the internet, including mobile applications ("apps") that interact with web sites for mobile devices. In addition to the conventional cataloging, the web crawler also evaluates web sites for content that is favorable to a product, service, or issue (collectively "topic"), which may be specified by one of its advertisers, promoters, or content providers. Such evaluation considers both the favorability of the content as well as the relevance, and in at least one embodiment rates the independence of the source. In some instances, highly favorable content that has only a small portion of relevance to the topic may not be as desirable as less favorable content that is highly relevant to the topic. The advertisers, typically through software such a control panel, may specify their topics of interest as well as the way links are placed on the placement web sites. Depending on the advertiser and the topic, more emphasis may be placed on highly favorable links, highly relevant links, or traditional advertising links. The advertisers may choose how and in what order to display links, with a combination of traditional advertising and other links with defined attributes of favorability and relevance.

The evaluation process may involve an automated evaluation of relevance and favorability by the matching of key words in appropriate contexts. Alternatively, human researchers, or "guides" that are knowledgeable in the domain, may select particular favorable and relevant links for advertiser's topics of interest. In some embodiments of the invention, these two methods of selection are used to augment each other, where an initial automated screening is subsequently review and ranked for favoritism, relevance, or other factors by a guide. In other embodiments of the invention, guides may create a list of links which are then quantitatively evaluated and ranked or scored. In further embodiments, combinations of guide evaluation and automated processes are used to evaluate links pertinent to the topic.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather than as a result of a instruction.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipments through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

The present invention may deal with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a worldwide network of computers, namely the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization).

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data ("CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java and Java ME (Java and JavaME are trademarks of Sun Microsystems, Inc. of Santa Clara, Calif.), BREW (BREW is a registered trademark of Qualcomm Incorporated of San Diego, Calif.), Windows Mobile (Windows is a registered trademark of Microsoft Corporation of Redmond, Wash.), Palm OS (Palm is a registered trademark of Palm, Inc. of Sunnyvale, Calif.), Symbian OS (Symbian is a registered trademark of Symbian Software Limited Corporation of London, United Kingdom), ANDROID OS (ANDROID is a registered trademark of Google, Inc. of Mountain View, Calif.), iPhone OS (iPhone is a registered trademark of Apple, Inc. of Cupertino, Calif.), and Windows Phone 7. "Mobile Apps" refers to software programs written for execution with Mobile Software.

In the following specification, the term "social network" may be used to refer to a multiple user computer software system that allows for relationships among and between users (individuals or members) and content accessible by the system. Generally, a social network is defined by the relationships among groups of individuals, and may include relationships ranging from casual acquaintances to close familial bonds. In addition, members may be other entities that may be linked with individuals. The logical structure of a social network may be represented using a graph structure. Each node of the graph may correspond to a member of the social network, or content accessible by the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Social networks may comprise any of a variety of suitable arrangements. An entity or member of a social network may have a profile and that profile may represent the member in the social network. The social network may facilitate interaction between member profiles and allow associations or relationships between member profiles. Associations between member profiles may be one or more of a variety of types, such as friend, co-worker, family member, business associate, common-interest association, and common-geography association. Associations may also include intermediary relationships, such as friend of a friend, and degree of separation relationships, such as three degrees away. Associations between member profiles may be reciprocal associations. For example, a first member may invite another member to become associated with the first member and the other member may accept or reject the invitation. A member may also categorize or weigh the association with other member profiles, such as, for example, by assigning a level to the association. For example, for a friendship-type association, the member may assign a level, such as acquaintance, friend, good friend, and best friend, to the associations between the member's profile and other member profiles.

Each profile within a social network may contain entries, and each entry may comprise information associated with a profile. Examples of entries for a person profile may comprise contact information such as an email addresses, mailing address, instant messaging (or IM) name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information or documents describing, identifying, or otherwise associated with a profile. Entries for a business profile may comprise industry information such as market sector, customer base, location, or supplier information; financial information such as net profits, net worth, number of employees, stock performance; or other types of information and documents associated with the business profile.

A member profile may also contain rating information associated with the member. For example, the member may be rated or scored by other members of the social network in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. Membership information may include information about a member's login patterns to the social network, such as the frequency that the member logs in to the social network and the member's most recent login to the social network. Membership information may also include information about the rate and frequency that a member profile gains association to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Examples of social networks include, but are not limited to, facebook, twitter, myspace, linkedin, and other systems. The exact terminology of certain features, such as associations, fans, profiles, etc. may vary from social network to social network, although there are several functional features that are common to the various terms. Thus, a particular social network may have more of less of the common features described above. In terms of the following disclosure, generally the use of the term "social network" encompasses a system that includes one or more of the foregoing features or their equivalents.

Figure 1:
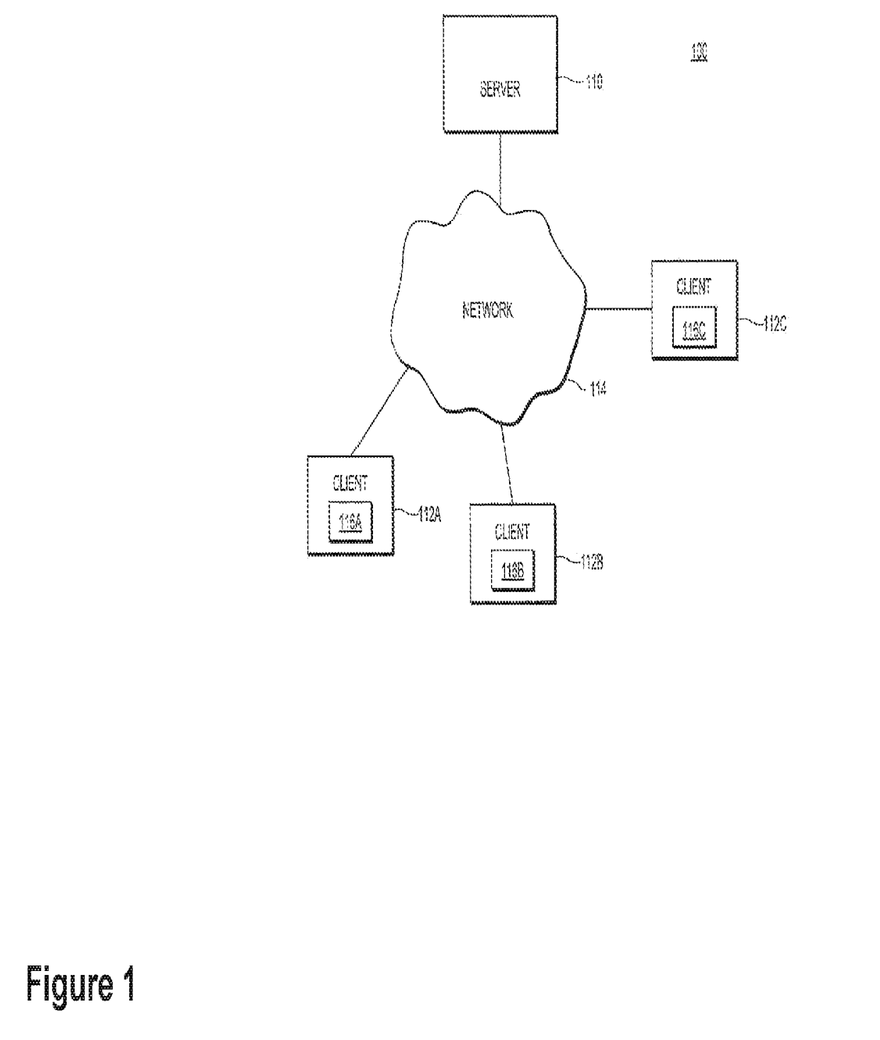
FIG. 1 is a schematic diagrammatic view of a network system in which embodiments of the present invention may be utilized.

FIG. 1 is a high-level block diagram of a computing environment 100 according to one embodiment. FIG. 1 illustrates server 110 and three clients 112 connected by network 114. Only three clients 112 are shown in FIG. 1 in order to simplify and clarify the description. Embodiments of the computing environment 100 may have thousands or millions of clients 112 connected to network 114, for example the Internet. Users (not shown) may operate software 116 on one of clients 112 to both send and receive messages network 114 via server 110 and its associated communications equipment and software (not shown).

Figure 2:
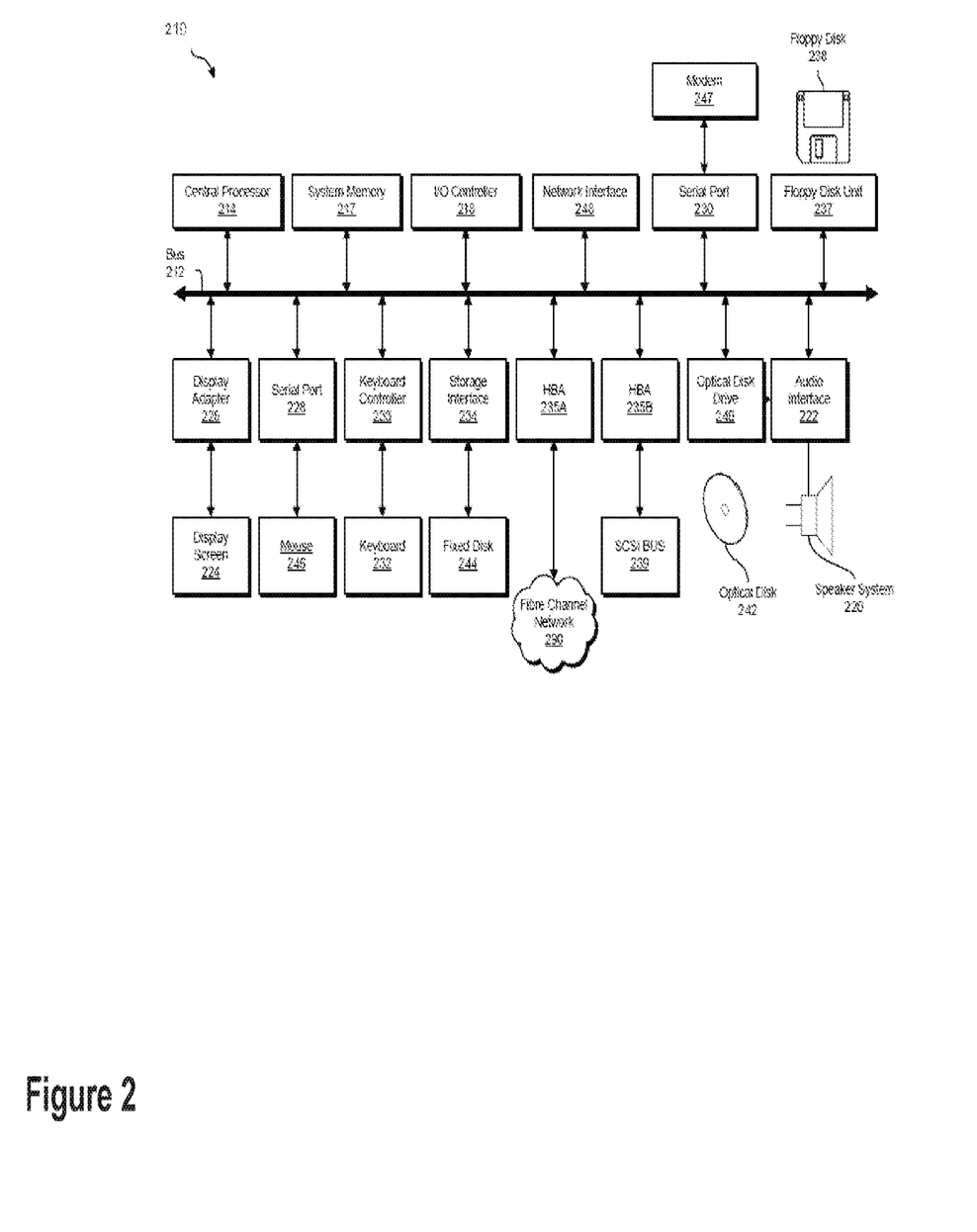
FIG. 2 is a block diagram of a computing system (either a server or client, or both, as appropriate), with optional input devices (e.g., keyboard, mouse, touch screen, etc.) and output devices, hardware, network connections, one or more processors, and memory/storage for data and modules, etc. which may be utilized in conjunction with embodiments of the present invention.

FIG. 2 depicts a block diagram of computer system 210 suitable for implementing server 110 or client 112. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fibre Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. Devices and subsystems may be interconnected in different ways from that shown in FIG. 2. Operation of a computer system such as that shown in FIG. 2 is readily known in the art and is not discussed in detail in this application. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
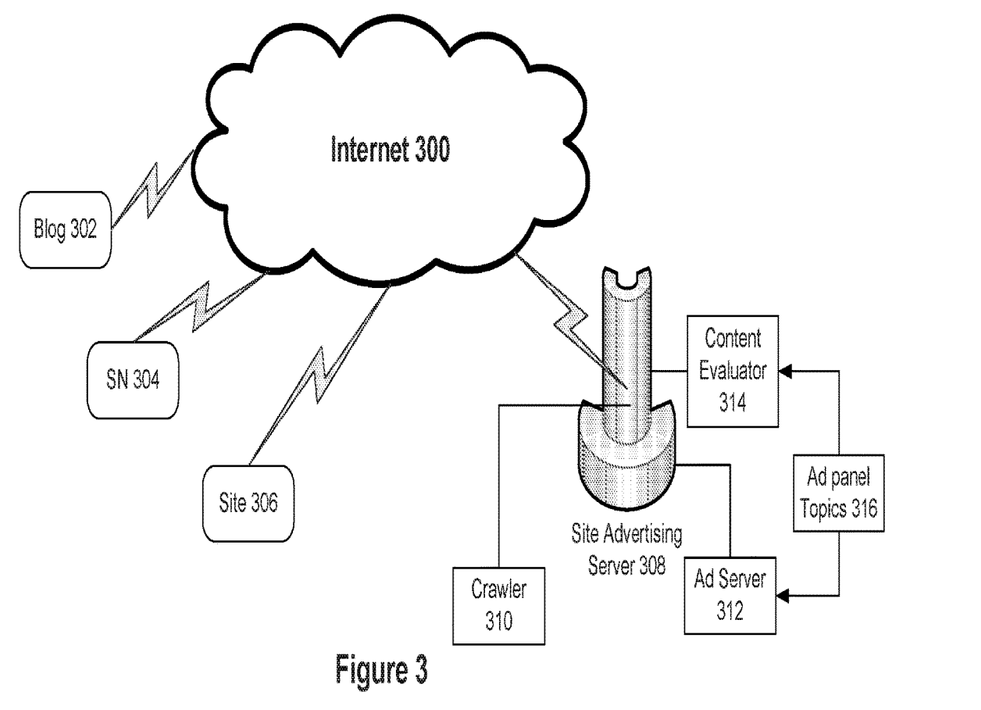
FIG. 3 is a schematic diagrammatic view of a web advertising server in one embodiment of the present invention.

FIG. 3 shows an embodiment of the invention. Internet 300 (representing the actual internet and/or other wide area networks) provides access to sites such as biogs 302, Social Networks (or "SN") 304, third party sites 306, and other possible references to locations. Site Advertising Server 308 accesses such web sites for software modules crawler 310, reference server 312, and content evaluator 314. The software modules reference server 312 and content evaluator 314 receive topics and other instructions from users of the search engine, e.g. content providers, advertisers, promoters, etc., through control panel topics 316. Although control panel topics 316 is shown as part of the software modules of reference server 312, control panel topics 316 may also represent input from modules running on other machines which are transmitted over internet 300 or by other means (wireless telecommunications, paper based communication, telephony, etc.).

Figure 4:
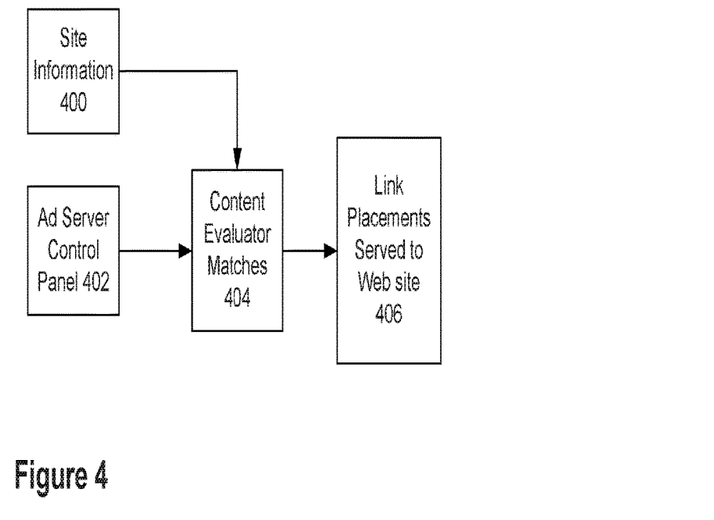
FIG. 4 is a flow chart diagram of the operation of the present invention relating to the placement of web site advertisements.

FIG. 4 shows a flow chart of the general operation of an embodiment of the present invention. Site Information step 400 involves the request for placement from a web site wherein the reference server checks the parameters of the web site requesting the placement. Step 400 may involve the examination of content and metadata relating to the requesting web site (including data available at the web site itself and also domain name information, third party ratings of web sites, etc.), cookies from the visitor or other visitor information (data input immediately preceding the placement request, prior search history, etc.), and other context information from the requesting web site. In one embodiment, step 400 further includes a rating of independence of the web site from the advocate of each topic by examining the content, metadata, and external material. In the evaluation of step 400, the presence of content in social networks and the association of the view in a particular social network or networks may be more highly rated than content just generally available. Such a rating process may be conducted completely automatically, with software evaluating the placement and context of various words indicative of favorable or unfavorable opinions about a topic. Alternatively, human guides may be used to evaluate the favorability. In one embodiment, software analytically assigns favorability ratings to each web site and provides a human guide a statistical analysis of the analytical rating value for the guide to make the ultimate determination regarding the favorability of the web site to the topic.

Reference Server Control Panel step 402 involves the search engine user inputting the topic and link display parameters into reference control panel software so that the topic and viewer parameters are communicated to the reference server, and optionally the independence rating. Site Information step 400 and Reference Server Control Panel step 402 may occur simultaneously or at separate times, but their results are input data for step 406 wherein one or more references are sent in response to the advertisement placement request, the references being displayed as links or frames and ordered in accordance with the specifications that the search engine user has specified in the control panel software. While this exemplary embodiment involves real time software modules implementing the specification of topic and viewer parameters, such specification of topic and viewer parameters may be made through several different methods, such as wireless communication, paper based transaction, etc.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A computer server for providing reference placement on sites accessible over a network by a viewer, said computer server comprising:
  a processor and associated memory said memory including:
    reference specification software module enabling the processor to receive and store a topic specified by a user and at least one parameter relating to the display of references relating to the specified topic for a specified type of viewer;
    site information software module enabling said processor to obtain information relating to at least one of a web site being visited and information relating to the viewer;
    content evaluation software module enabling said processor to evaluate the favorability of content of a web page in relation to the specified topic, wherein favorability relates to approving or supporting the specified topic; and
    placement software module enabling said processor to send at least one reference to the web page in response to a placement request wherein the reference relates to content correlated to the parameter and specified topic in accordance with favorability indicated by the content evaluation software module,
  wherein said content evaluation software module further enables the processor to evaluate the relevance of content of the web site relating to the specific topic.

2. The computer server of claim 1 wherein said content evaluation software module further enables said processor to evaluate the independence of the web site from sponsors of the specified topic.

3. The computer server of claim 1 wherein said placement software module enables the processor to send the at least one reference in the form of one of a frame and a link.

4. A method of using a computer to send reference placements in response to a request from a user, said method executed by a processor of the computer comprising the steps of:
  receiving and storing, by a reference specification software module, a topic specified by a user and at least one parameter relating to the display of references relating to the specified topic for a specified type of viewer;
  obtaining, by a site information software module, information relating to at least one of a web site being visited and information relating to the viewer;
  evaluating, by a content evaluation software module, the favorability of content of a web page in relation to the specified topic, wherein favorability relates to approving or supporting the specified topic; and
  sending, by a placement software module, at least one reference to the web page in response to a placement request wherein the reference relates to content correlated to the parameter and specified topic in accordance with favorability indicated by the content evaluation software module,
  wherein said content evaluation software module further enables the processor to evaluate the relevance of content of the web site relating to the specific topic.

5. The method of claim 4 the step of evaluating further includes rating independence of web sites from a particular topic, and further including the step of providing at least one reference to the user relating having an independence rating.

6. The method of claim 4 wherein said sending step involves sending the at least one reference in the form of one of a frame and a link.

7. The method of claim 4 wherein said evaluating step involves evaluating the relevance of content of the web site relating to the specific topic.

8. The method of claim 4 wherein said evaluating step involves evaluating a plurality of web sites with favorability to the identified topic, and sending the at least one reference based on the web site being located within a social network.

9. A method of using a computer to send a reference link in response to a query request from a user regarding a particular topic, said method executed by a processor of the computer comprising the steps of:
  receiving and storing, by a reference specification software module, the query request including a topic of interest specified by the user and at least one parameter relating to the display of references relating to the specified topic for a specified type of viewer;
  responding to the query request by correlating the topic of interest with a favorable web site and evaluating, by a content evaluation software module, at least one web site for favorability to the specified topic and which is associated with a social network of the user, wherein the favorability relates to approving or supporting the specified topic; and
  sending, by a placement software module, a computer file including at least one reference link to the favorable web site in response to the query request, wherein said at least one reference link relates to content correlated to the parameter and specified topic in accordance with the favorability indicated by the content evaluation software module,
  wherein said content evaluation software module further enables the processor to evaluate the relevance of content of the web site relating to the specific topic.

10. The method of claim 9 wherein said responding step involves evaluating a plurality of web sites with favorability to the identified topic, and selecting the at least one reference link based on independence of the web site.

11. The method of claim 9 wherein said responding step includes identifying at least one web site with content associated with a friend of the user in the social network.

12. The method of claim 11 wherein said sending step includes sending instructions to display information about the friend with the at least one reference link.

13. The computer server of claim 1 wherein said placement software module enables said processor to send the at least one reference to the web page in response to a placement request wherein the at least one reference relates to content correlated to the parameter, specified topic and viewer.

* * * * *